(12) United States Patent
Banerjee

(10) Patent No.: US 8,000,892 B2
(45) Date of Patent: Aug. 16, 2011

(54) PEDESTRIAN MAPPING SYSTEM

(75) Inventor: Arup Banerjee, Bethesda, MD (US)

(73) Assignee: Campus Destinations, Inc., Durham, NC (US)

( * ) Notice: Subject to any disclaimer, the term of this patent is extended or adjusted under 35 U.S.C. 154(b) by 901 days.

(21) Appl. No.: 11/811,808

(22) Filed: Jun. 12, 2007

(65) Prior Publication Data
US 2008/0312819 A1    Dec. 18, 2008

(51) Int. Cl.
*G01C 21/00* (2006.01)
*G08G 1/123* (2006.01)

(52) U.S. Cl. ........ 701/202; 701/200; 701/201; 701/207; 701/209; 701/210; 340/988; 340/995.1; 340/995.19; 340/995.21; 340/995.22; 340/995.23; 340/995.24; 340/995.27

(58) Field of Classification Search .......... 701/200–215; 340/988–995.27
See application file for complete search history.

(56) References Cited

U.S. PATENT DOCUMENTS

| | | | |
|---|---|---|---|
| 5,559,707 A | 9/1996 | DeLorme et al. | |
| 5,802,492 A | 9/1998 | DeLorme et al. | |
| 6,119,065 A | 9/2000 | Shimada et al. | |
| 6,321,158 B1 * | 11/2001 | DeLorme et al. | 701/201 |
| 6,339,746 B1 | 1/2002 | Sugiyama et al. | |
| 6,351,710 B1 | 2/2002 | Mays | |
| 6,510,379 B1 | 1/2003 | Hasegawa et al. | |
| 6,594,581 B2 | 7/2003 | Matsuda et al. | |
| 6,615,133 B2 * | 9/2003 | Moskowitz et al. | 701/209 |
| 6,622,089 B2 | 9/2003 | Hasegawa et al. | |
| 6,718,262 B2 | 4/2004 | Matsuda et al. | |
| 6,728,636 B2 | 4/2004 | Kokojima et al. | |
| 6,820,005 B2 | 11/2004 | Matsuda et al. | |
| 2002/0120398 A1 | 8/2002 | Matsuda et al. | |
| 2002/0120622 A1 | 8/2002 | Hasegawa et al. | |
| 2003/0060978 A1 | 3/2003 | Kokojima et al. | |
| 2003/0149525 A1 | 8/2003 | Matsuda et al. | |
| 2003/0208315 A1 | 11/2003 | Mays | |
| 2004/0098192 A1 | 5/2004 | Matsuda et al. | |
| 2004/0107044 A1 | 6/2004 | Hasegawa et al. | |
| 2004/0193365 A1 | 9/2004 | Kokojima et al. | |
| 2006/0146719 A1 | 7/2006 | Sobek et al. | |
| 2006/0184314 A1 | 8/2006 | Couckuyt et al. | |
| 2006/0247852 A1 * | 11/2006 | Kortge et al. | 701/209 |
| 2006/0265294 A1 * | 11/2006 | de Sylva | 705/28 |
| 2007/0005240 A1 * | 1/2007 | Oumi et al. | 701/209 |
| 2007/0040705 A1 * | 2/2007 | Yoshioka et al. | 340/988 |
| 2009/0048771 A1 * | 2/2009 | Speier et al. | 701/200 |
| 2009/0177387 A1 * | 7/2009 | Liu | 701/209 |
| 2010/0036599 A1 * | 2/2010 | Froeberg et al. | 701/200 |

* cited by examiner

*Primary Examiner* — John Q Nguyen
*Assistant Examiner* — Chuong P Nguyen
(74) *Attorney, Agent, or Firm* — Triangle Patents

(57) ABSTRACT

The present invention is directed toward a system and method for a web-based mapping and routing service for pedestrians, which may include wheeled transportation (e.g. buses). More specifically, the present invention is directed toward use on a college campus. The present invention provides customized pedestrian routes highlighting campus and community locations while providing navigation options concerning walking distance and safety factors. This provides custom routes to each user that are designed to be optimized for safety or speed depending on user input.

12 Claims, 12 Drawing Sheets

Fig. 11

```
for (int v= 0; v < n; v++){
    dist[v] = INFINITY;
    parent[v] = -1;
}
dist[s] = 0;
PriorityQueue fringe = new PriorityQueue();
fringe = all Vertices;
while(!fringe.isEmpty()) {
    Vertex v = fringe.removeMin();
    if (!geMark(v)){
        setMark(v);
        for each edge (v, v1, w){
            if (!getMark(v1) && dist[v1] > w + dist[v])
                dist[v1] = w + dist[v];
                fringe.reorder();
                parent[v1] = v;
        }
    }
}
```

PEDESTRIAN MAPPING SYSTEM

BACKGROUND OF THE INVENTION

1. Field of the Invention

The present invention relates generally to providing a web-based mapping service for pedestrians and more specifically, pedestrians on a college campus. Further, the present invention relates to providing customized pedestrian routes highlighting campus and community locations while providing navigation options concerning walking distance and safety factors.

2. Description of the Prior Art

In today's world, customizable mapping services have become a part of daily life. While the majority of services focus on driving directions, mapping services for pedestrians are becoming more prevalent. There are online mapping services and handheld navigation devices available that address pedestrian routing, but in a manner very similar to that of driving directions. Additionally, the majority of these services focus on mapping urban environments for those concerned with navigating complex metropolitan areas. Pedestrians on a college campus (including students, alumni, visitors, etcetera) face the challenge of navigating campuses, lecture halls, and the surrounding community traditionally on foot.

Generally, the current solutions provide point-to-point navigation, but do not provide the multi-faceted approach needed for students today. Currently available systems provide only general pedestrian route generation. One such solution is disclosed in U.S. Pat. No. 6,510,379 titled "Method and apparatus for automatically generating pedestrian route guide text and recording medium" by Hasegwa, et al., which discloses a pedestrian route guide apparatus that includes an input section which inputs a departure place and destination, a route data storage section for storing route data, a landmark storage section which stores a landmark, a route computation section which computes a route from the departure place to the destination on the basis of route data, a route editing section which edits the route, a landmark selector section which selects a landmark at each point on the route on the basis of the route obtained by the route editing section, a route guide text generator section which generates a route guide text on the basis of the route obtained by the route editing section and the landmark information selected by the landmark selector section, and a route text output section which presents the route guide text.

Another solution is described in U.S. Pat. No. 5,559,707 titled "Computer aided routing system" to DeLorme et al., which describes a computer aided routing system (CARS) that determines a travel route between a user selected travel origin and travel destination following user selected waypoints along the way. A CARS database incorporates travel information selected from a range of multimedia sources about the transportation routes, waypoints, and geographically locatable points of interest (POIs) selected by the user along the travel route. The CARS software permits user selection of specified POI types within a user-defined region of interest and user selection of particular POIs from the selected types within the region of interest. The transportation routes, waypoints, POIs and region of interest are identified in the computer by coordinate locations of a selected geographical coordinate system. The CARS software is constructed to present a user-customized travel log for preview on the computer display of the user-defined travel route. The travel planner can preview on the computer display a multimedia travel log particularly customized for the user-defined travel route including multimedia information on the transportation routes, waypoints, and POIs selected by the user. The user can engage in an iterative trip planning process of revising the route and previewing travel logs of revised travel routes until a satisfactory travel route is determined.

The above solutions discuss route generation based on the user input of departure and destination points. Additional systems describe the land marking of destinations based on categories including food, entertainment, etc.

Additionally, there is a solution that offers a navigation system within complex buildings or structures. U.S. Pat. No. 6,728,636, entitled "Destination guidance system and method for generating individually tailored routes within a complex structure" by Kokojima, et al. describes a destination guidance system for providing presentation information that contains guidance pertaining to movement from a place of departure to a destination on the basis of structure information and guidance information on the premises of a building or construction. As defined by this patent, the presentation information contains both information of the entire three-dimensional structure, and detailed information, and a three-dimensional movement and normal two-dimensional movement in the presentation information are presented by different methods. Also, this patent is directed to a destination guidance data acquisition system for acquiring structure information and guidance information on the premises of a building, which are used by the destination guidance system. The destination guidance data acquisition system inputs and compiles information of a three-dimensional structure on the basis of a plan view of the building to support acquisition of the detailed information.

While the above patent describes a system that is helpful to individuals searching for a specific room within a building, this service does not deliver the associated directions to the building. Additionally, with some routes, it might be advantageous to utilize a path through a building rather than around a building in the interest of time. Thus, there is a need for a mapping service that would take a user from departure to the exact location desired, whether that is a public point or a specific location within a building. Furthermore, there is a clear need for a solution which addresses the relative safety factor with any pedestrian's generated route due to the user's assumed inexperience with the geographic area being covered.

None of the previous systems address issues of one's physical safety, which is a large concern to pedestrians and especially pedestrians on a college campus. Therefore, there is a need for a solution that combines the aspects of route generation and building navigation while addressing issues of user safety. The solution should connect the user with the surrounding community through an easy to use user-interface. Further, the solution should incorporate information regarding local attractions and activities with which to connect the user.

Though there exist solutions that address route generation, building navigation, etcetera, there are no solutions that combine these aspects to specifically address the needs of a variety of pedestrians, including pedestrians on a college campus. Thus, there is a need for a personal navigation system that provides reliable and safe routes and information about an area, including the detailed area of a college campus.

SUMMARY OF THE INVENTION

A first aspect of the present invention is to provide a method of identifying a representation of at least one route for guiding a user including the following steps: generating a start and end point; generating a safety factor; providing route data comprising segments, safety ratings, and lengths wherein each segment has an associated safety rating and length; determining at least one route between the start and end point from the route data and the safety factor; and identifying a representation of the at least one route.

A second aspect of the present invention is to provide a computer readable medium having instructions for causing a computer to execute a method including: generating a start and end point; generating a safety factor; providing route data comprising segments, safety ratings, and lengths wherein each segment has an associated safety rating and length; determining at least one route between the start and end point from the route data and the safety factor; and identifying a representation of the at least one route.

A third aspect of the present invention is to provide a directional guide for safe passage between at least two points comprising: at least one segment having a length and a safety rating connecting the at least two points; at least one direction identifying the at least one segment; and wherein the at least one segment is determined from the at least one segment's length and safety rating.

Thus, the present invention provides custom routes to a user that are designed to be optimized for safety or speed depending on user input.

These and other aspects of the present invention will become apparent to those skilled in the art after a reading of the following description of the preferred embodiment when considered with the drawings, as they support the claimed invention.

BRIEF DESCRIPTION OF THE DRAWINGS

FIG. 11 is pseudo code for Dijkstra's algorithm as utilized according to one embodiment of the present invention.

DETAILED DESCRIPTION

Figure 1:
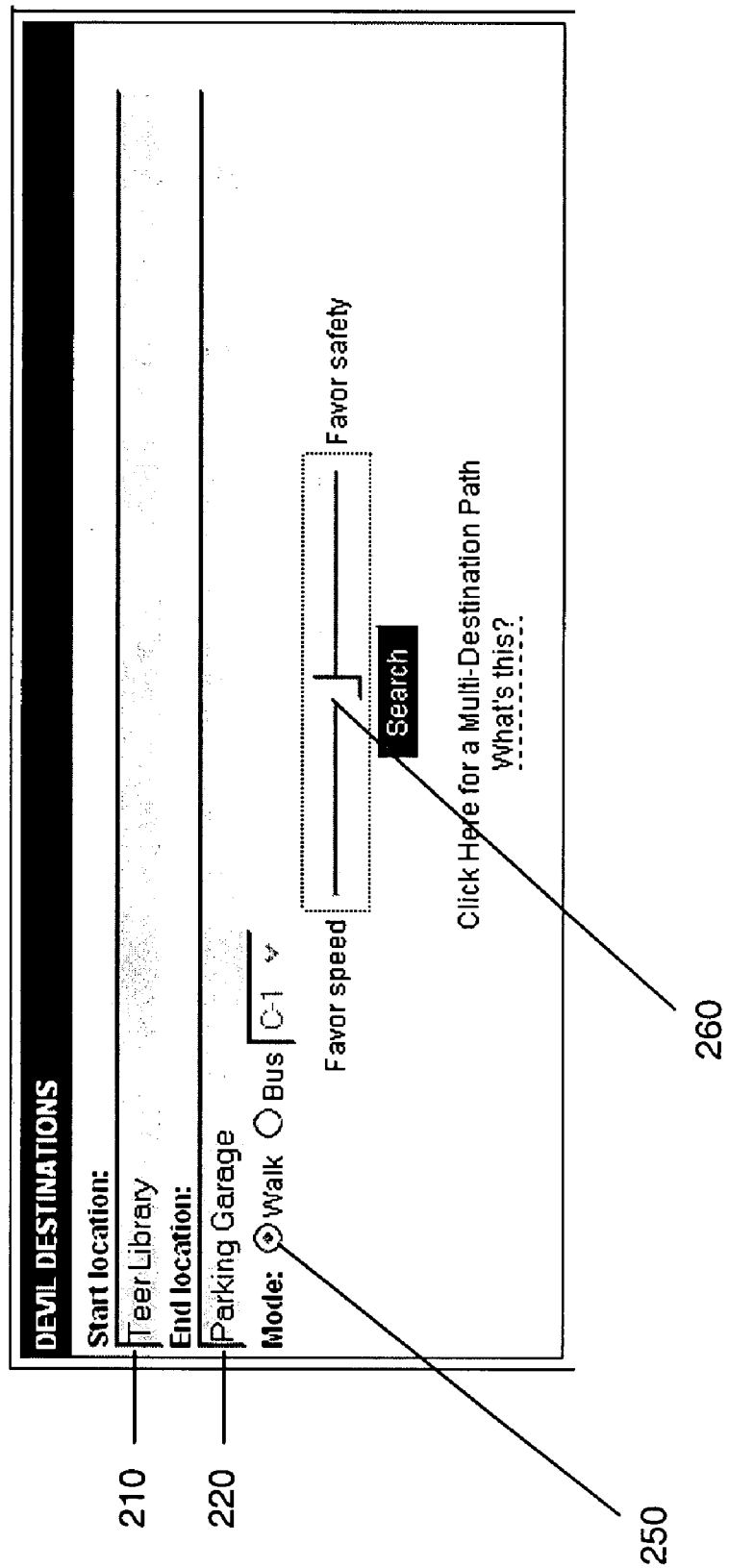
FIG. 1 is a screen view of a graphical user interface presenting inputs for starting and ending locations, as well as a safety slider according to one embodiment of the present invention.

In the following description, like reference characters designate like or corresponding parts throughout the several views. Also in the following description, it is to be understood that such terms as "forward," "rearward," "front," "back," "right," "left," "upwardly," "downwardly," and the like are words of convenience and are not to be construed as limiting terms.

Overall System

The present invention preferably provides a method and system to generate a web-based navigation and community information center focusing on college communities. Note that the term "college," for the purposes of the present invention, is synonymous with "university," "campus," "school," and like terms.

The overall system of the present invention is preferably implemented as a client-server model where the users access the system at clients that communicate with at least one server. A server is connected to multiple clients via a network. The server may be any personal computer having one or more processing means, storage means and memory means, as commonly known in the art. Clients can be personal computers, laptop computers, tablet PCs, mobile phones and other devices known in the art capable of accessing a website or running a standalone application. The clients access the server via the network. The network can be a local intranet, the Internet, and the means of access the server may be wired, wireless or via a mobile network.

Alternatively, the system of the present invention can be likewise implemented without a network and can run on a stand alone computer, the stand alone computer may be any personal computer having one or more processing means, storage means and memory means, as commonly known in the art. Alternatively the stand alone computer may also be a mobile phone, a personal digital assistant (PDA), global positioning system (GPS) device, and other devices known in the art capable of running software, accepting input, and producing output. In such an embodiment, software of the present invention may be updated through over the Internet, but the system does not require a network to function properly; it runs entirely on the stand alone computer containing all the necessary components detailed below.

The server has a database residing on it. The database is capable of storing data and organizing data into tables. Commercial examples of the database include Microsoft® SQL Server and Oracle®. In another embodiment of the present invention, the database may be separate from the server. The database may be on a second server that is connected to the server by mechanisms commonly known in the art. The system is capable of displaying information graphically and/or textually to an electronic display or monitor and further is capable of printing similar information onto paper media.

Routing System

One element of the present invention generates custom pedestrian walking routes for college campuses. Referring now to the drawings in general, the illustrations are for the purpose of describing a preferred embodiment of the invention and are not intended to limit the invention thereto. As best seen in FIG. 1, the system provides a graphical user interface (GUI) as best seen overall in FIG. 1. Input boxes 210 and 220 hold user-inputted Start and End Locations respectively. The system of the present invention analyzes these inputs and provides a custom digital map highlighting the route between the two points.

The digital map highlighting the route between the two points is a representation of the recommended route. To determine the route, at least two pieces of data are stored with each route segment (which when combined with certain other segments, may form the recommended route). Each segment, which represents a linear geographical line between two points or nodes, is identified and stored on the database of the present invention. Each segment preferably contains two associated data also stored on the database. First, each segment has a length, or distance, representing its geographical distance. Second, each segment also has a safety rating, a number representing an objective evaluation of the relative safety risk of that route segment. By combining at least these two data from at least one route segment with a user-defined safety factor, discussed below, the system of the present invention is able to produce the recommend route.

Preferably the system is programmed to be user friendly such that as a user begins typing the name or address or a location, the system presents the user with a list of the possible choices that begin with the symbols the user has entered to date. For instance if the user begins typing in "Smith Hall," after the user has typed S, the system may show a list of locations beginning with S, and then as the user adds additional letters, the system shows less locations that continue to match the user's typing. The user may optional type the full name of the location or select the location after typing several letters by either clicking on it with a mouse, or by using a keyboard's cursor keys to select the location's name.

While this system is designed primarily for pedestrian purposes, it can incorporate other forms of personal transportation available. While assuming that the user does not have a car, transportation options such as campus and public buses, taxis, hourly car rentals (such as a "Zipcar"), or any other simple means of transport can be incorporated as well (e.g. bicycle and subway), collectively called "wheeled" transportation. This option is illustrated by radio buttons 250 in FIG. 1 (presenting options for "Walk" and "Bus"). These means could be used for any or all portions of the planned directions. According to one embodiment of the present invention, if the user sets the radio button 250 to "Walk," then the system will present a route on a map that only uses walking routes. If the user sets the radio button 250 to "Bus" and chooses an preferred Bus route in an optional drop box to the right of radio buttons 250, then the system will present an optimized route on a map that uses walking routes and bus routes where appropriate to minimize travel time (e.g. where, for 1 mile of a 1.5 mile trip, the system recommends the user to take a bus). Opting to take a bus for a portion of a map preferably alters the visual map provided to the user so as to show the route the bus is covering. The bus portion of the total route is preferably a different color. The system presents the user with the total route's distance based on mapping coordinates. The database of the present invention also contains bus schedules (e.g. time tables) and can convey such to the user. Further, after selecting the "Bus" option, bus routes that complete the total route are presented and the user is allowed to select a desired bus route. Alternatively, for simplicity, the user may not be shown the different bus routes that complete the trip, but the system chooses a best bus route based on the bus schedule and distance (as may be weighted by safety factors/ratings, see below).

Safest Route Feature

The present invention preferably takes a user specified safety factor into account for generating different routes. The safety factor is associated with different areas of any proposed route. The safety factor would be based on various parameters. For instance, parameters influencing the safety factor of a route might include, but are not limited to, lighting, previous recorded incidents, proximity to "help stations" (e.g. emergency call stations), populated vs. unpopulated areas at night (residential vs. academic buildings, where residential buildings would more likely be safer because they generally contain more people at night), shaded areas, proximity to roads, availability of sidewalks, surroundings (e.g. forest, traffic concentration, and crime reports/maps). Further, the system permits an administrator of the server and database to subjectively assign and update different levels of safety to various route segments if necessary.

When the user plans a walking route they are able to choose their own preferred risk level, which will affect the generated route according the safety factors mentioned above. As best seen in FIG. 1, a screenshot of a graphical user interface illustrating the user's input data. The user's "safety slider" 260 allows one to choose his or her preferred safety setting by sliding the bar to the left or right. The associated risk will be based on a rating system with a numerical scale, e.g. from 1-100. Furthermore, the user can elect to take the shortest possible walking route with or without safety as a contributing factor. In other embodiments, the safety factor can be system generated based on predetermined choices such as "Safest," "Safe But Quick," "Quick," "Do Not Consider Safety," etcetera. These choices could be embodied as radio buttons that set the safety factor to a predetermined value.

Figure 2A:
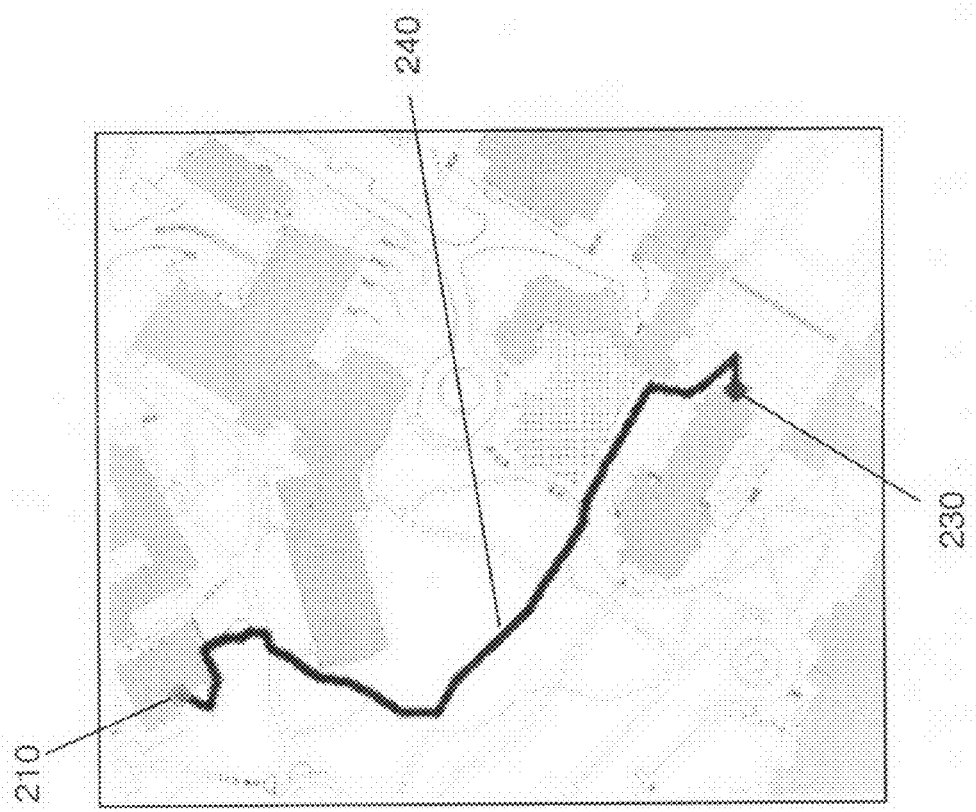
FIGS. 2A and 2B are screen views of a pair of generated walking routes comparing the user preferences of speed and safety according to one embodiment of the present invention, respectively.
Figure 2B:
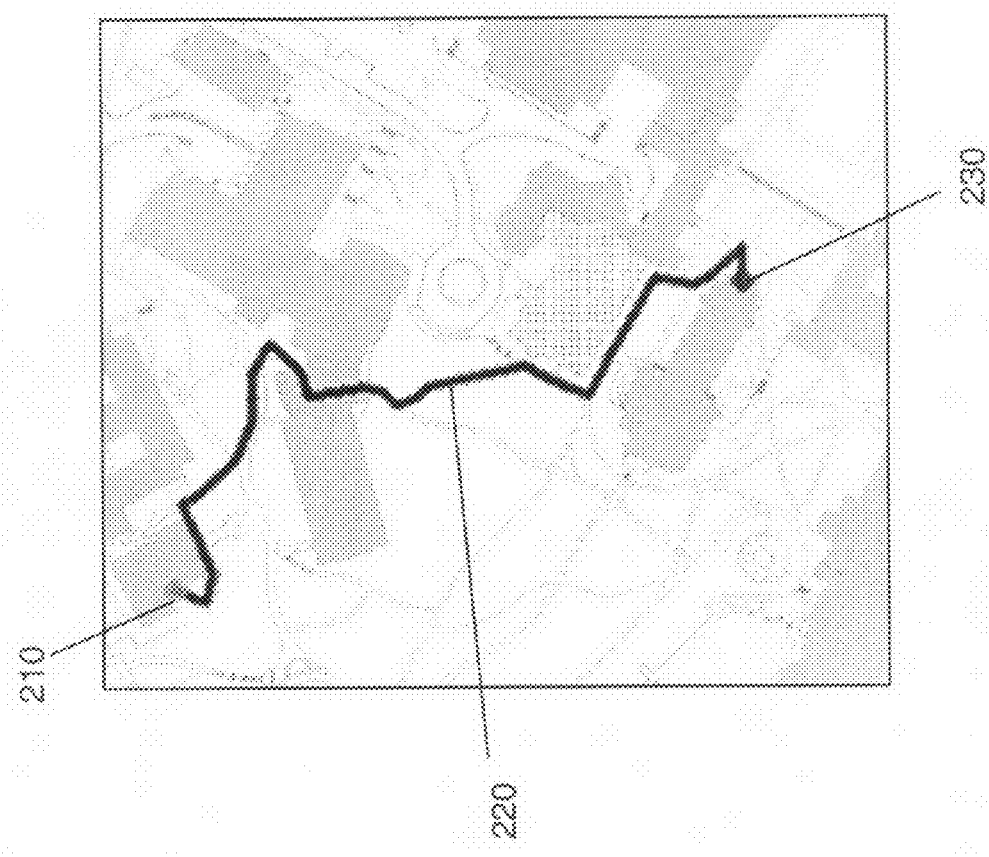

FIGS. 2A and 2B show screenshots of two possible routes 220 and 240, between two points 210 and 230. Route 240 favors speed while route 220 favors safety (also referred to as the faster route and the safer route, respectively). The safety factors that account for this example where route 220 is safer but slower because it has a well lit path and passes through a university building whereas route 240 is less safe but faster because it passes through and/or near a wooded area, is darker, and has a closer proximity to a road.

The ultimate route chosen by the system is determined by selecting a series of segments that has the lowest overall weight (by averaging weights, summing, etcetera and preferably using Dijkstra's algorithm as described below) compared to the overall weight of all other possible routes that go between the start and end points. The weight of each route segment is calculated by an equation that uses a relationship between the route data and the safety factor. Preferably and for reasons explained below, the equation uses a non-linear relationship between the route data and the safety factor.

According to the present invention, one option for an algorithm that incorporates the safety factor could be implemented as follows. The weight of each edge, or route segment, in the graph (map) is preferably given by the following equation:

$$\text{weight}=(\text{length})/((\text{safety rating})^{\wedge}(\text{safety factor}))$$

where the length is the route segment length or distance, the safety rating is the safety of a given edge (preferably a number ranging from 1-10), and the safety factor is the importance of safety in determining the path (preferably a number ranging from 0-2, or alternatively, from 1-100, provided by the slider bar, element 260 in FIG. 1). Note that the distance allows for a speed factor to be taken into account on the slide bar 260, modifying slightly the ultimate safety rating used by the above equation. The above equation scales the weight of each edge by the relative safety of this edge, using the safety factor to determine how much the weight should be scaled. The weight determined by the above equation is used in the algorithm of the present invention as described below.

It should be noted that the above equation has a non-linear relationship between the safety rating and safety factor. This is preferable to linear relationships because in the latter case, the system may not distinguish between different routes. With linearity, the ratio between two potential paths will always be the same, regardless of user-determined safety factor. This is because, with linearity (e.g. where the safety factor is multiplied by the safety rating), the safety factor can be factored out due to multiplication/addition rules. If the ratio between two potential paths is independent of the safety factor, then safety factor does not influence the choice of path.

Below is an illustration showing why multiplication of the safety rating and safety factor may be less desirable than the above equation which uses an exponential relationship between the safety rating and safety factor. First, assume there are have two paths from A to B. Path X is length 10 with safety rating of 1 (low safety) and Path Y is length 15 with safety rating of 10 (very safe).

Using multiplication (a linear relationship):

If user chooses 1 as safety factor (wants speed)→Path Y is chosen

Path $X=10*(1/(1*1))=10$

Path $Y=15*(1/(10*1))=1.5$

If user chooses 10 as safety factor (wants safety)→Path Y is chosen

Path $X=10*(1/(1*10))=1$

Path $Y=15*(1/(10*10))=0.15$

With exponential (and scaling the safety factor to be between 0 and 2):

If user chooses 1 as safety factor (which corresponds to 0)→Path X is chosen

Path $X=10*(1/(1^0))=10$

Path $Y=15*(1/(10^0))=15$

If user chooses 10 as safety factor (which corresponds to 2)→Path Y is chosen

Path $X=10*(1/(1^2))=10$

Path $Y=15*(1/(10^2))=0.15$

Alternatively, the safety factor or rating can be omitted from the calculation, if desired. In this case, the safety factor would be set to zero, and the weight determined by the above equation will be equal to the distance of the edge only. Additionally, alternative algorithms to that shown above could be used to weight or normalize the route segments on the basis of the segments length, its safety rating, and a user defined safety rating to provide routing options that take safety into consideration.

Multiple Nodes

Figure 3:
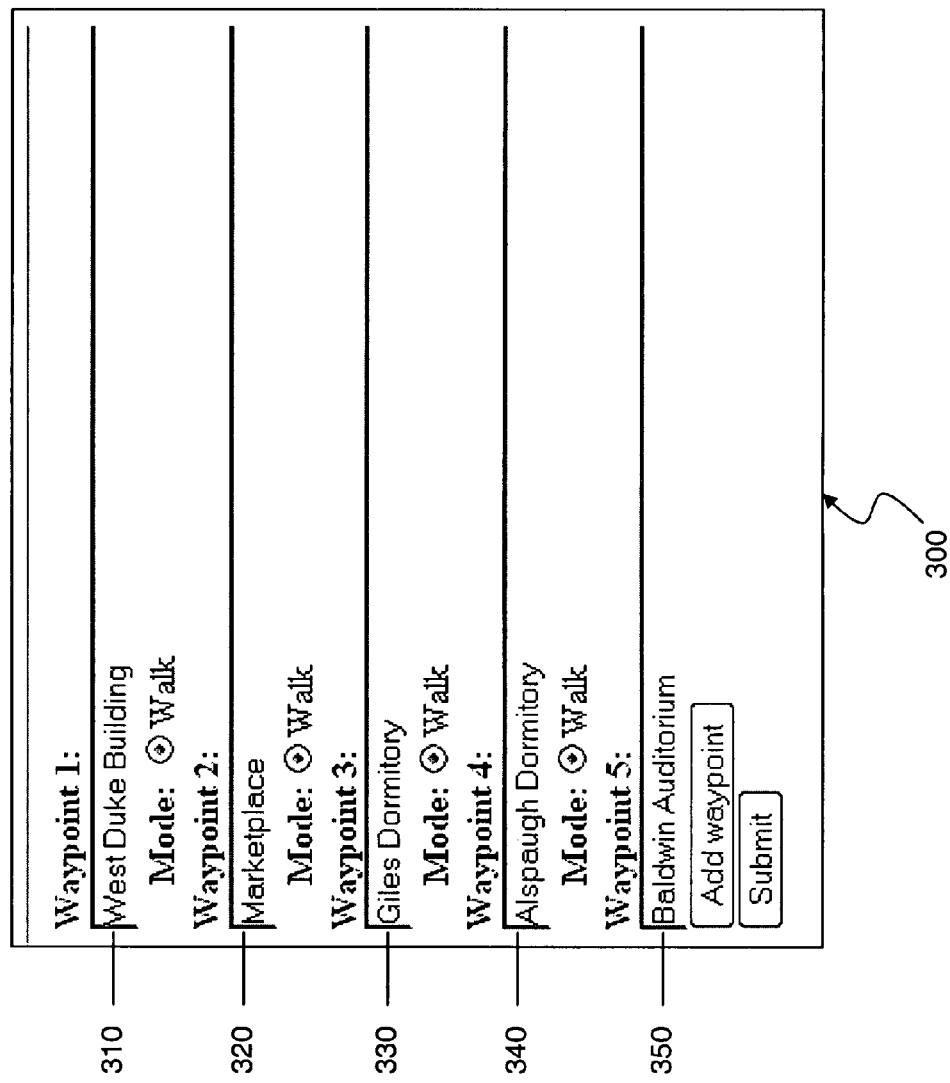
FIG. 3 is a screen view of a graphical user interface presenting one set of elements for a multiple-destination walking route according to one embodiment of the present invention.
Figure 4:
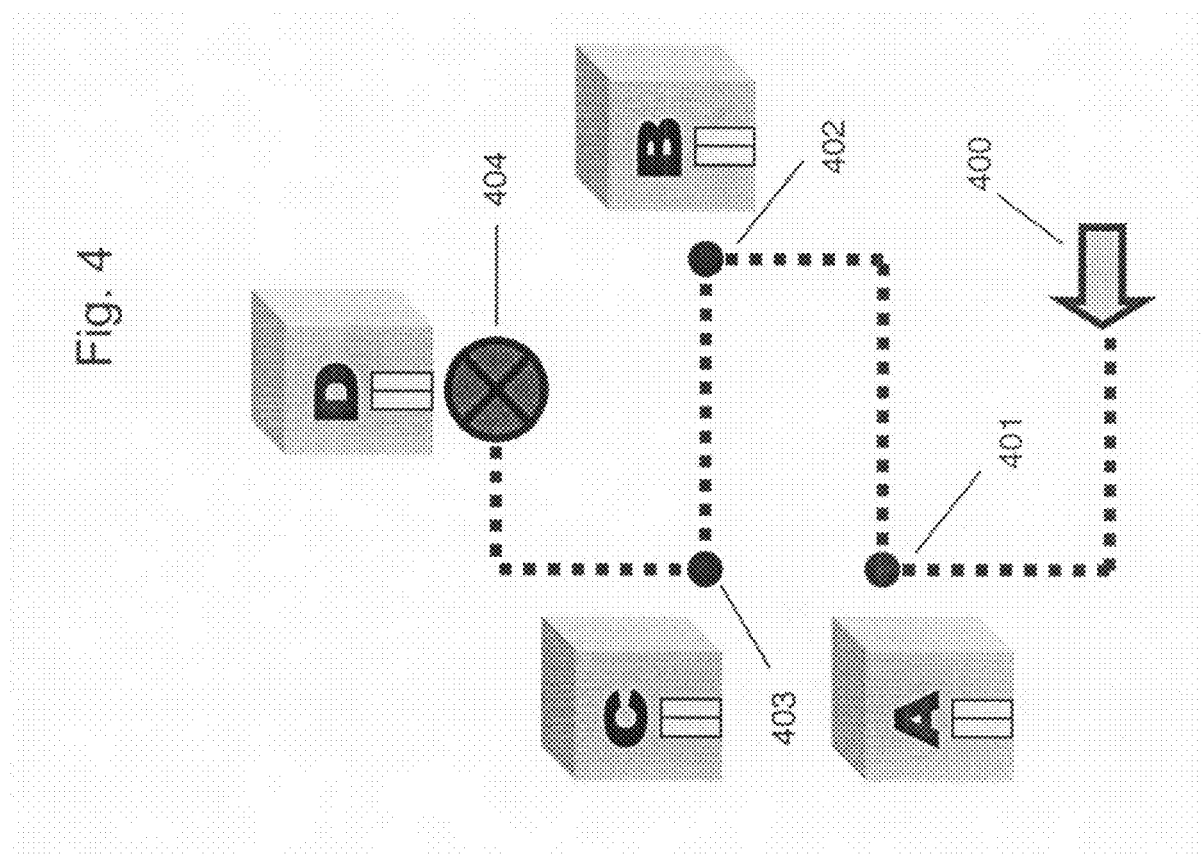
FIG. 4 is a simplified graphical representation of a multiple-destination walking route according to the present invention.
Figure 5:
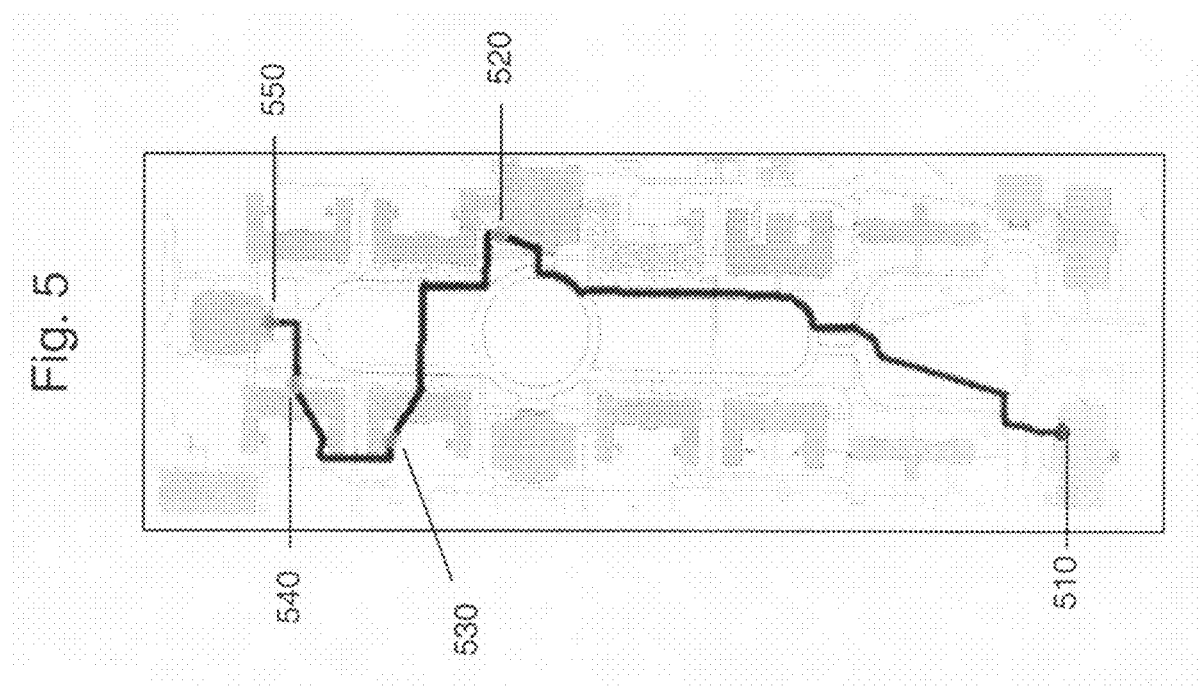
FIG. 5 is a screen view of a multiple-destination walking route with one set of elements, as input in FIG. 3, according to one embodiment of the present invention.
Figure 6:
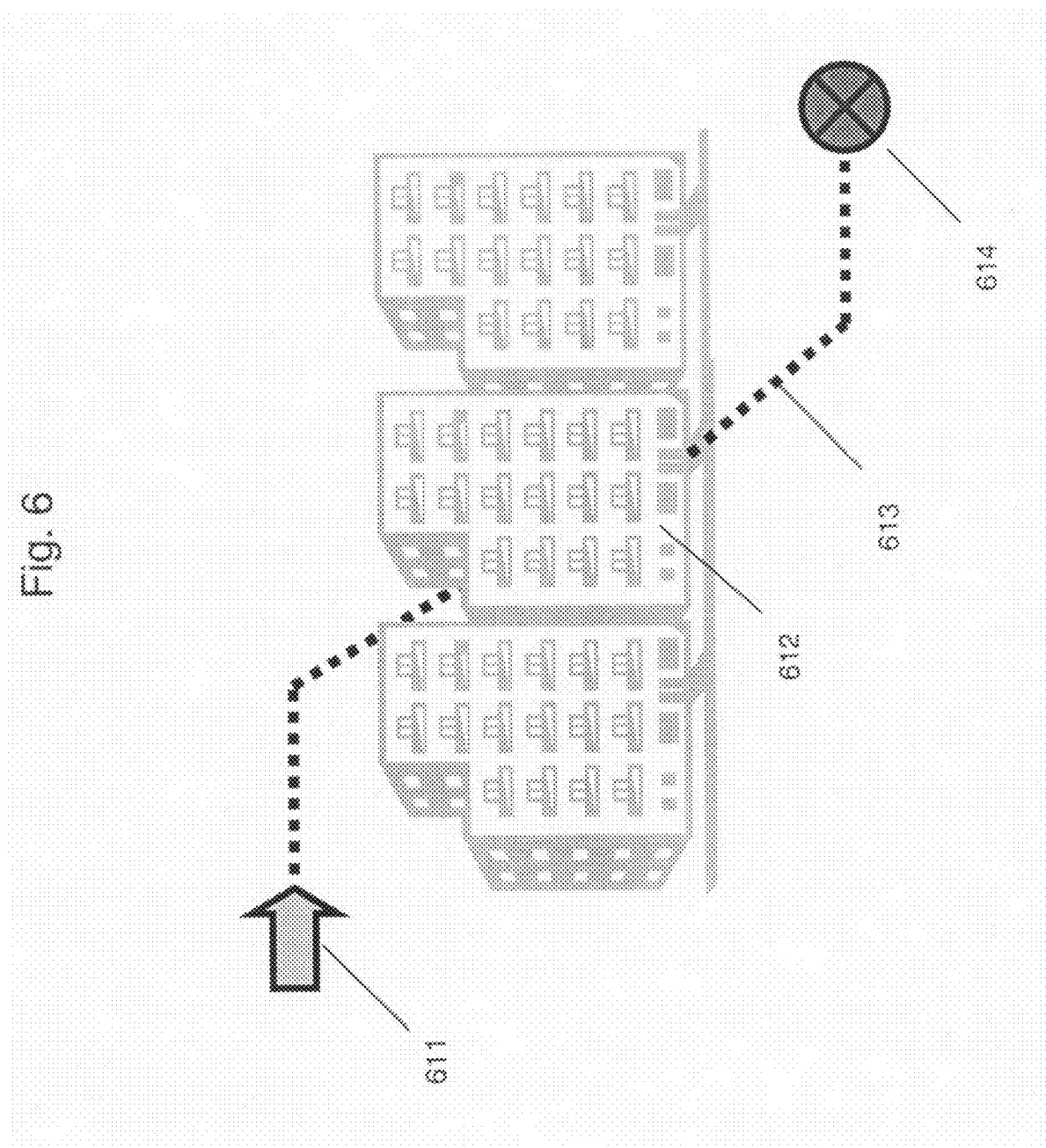
FIG. 6 is a simplified graphical representation of a walking route navigated through a building according to the present invention.
Figure 7:
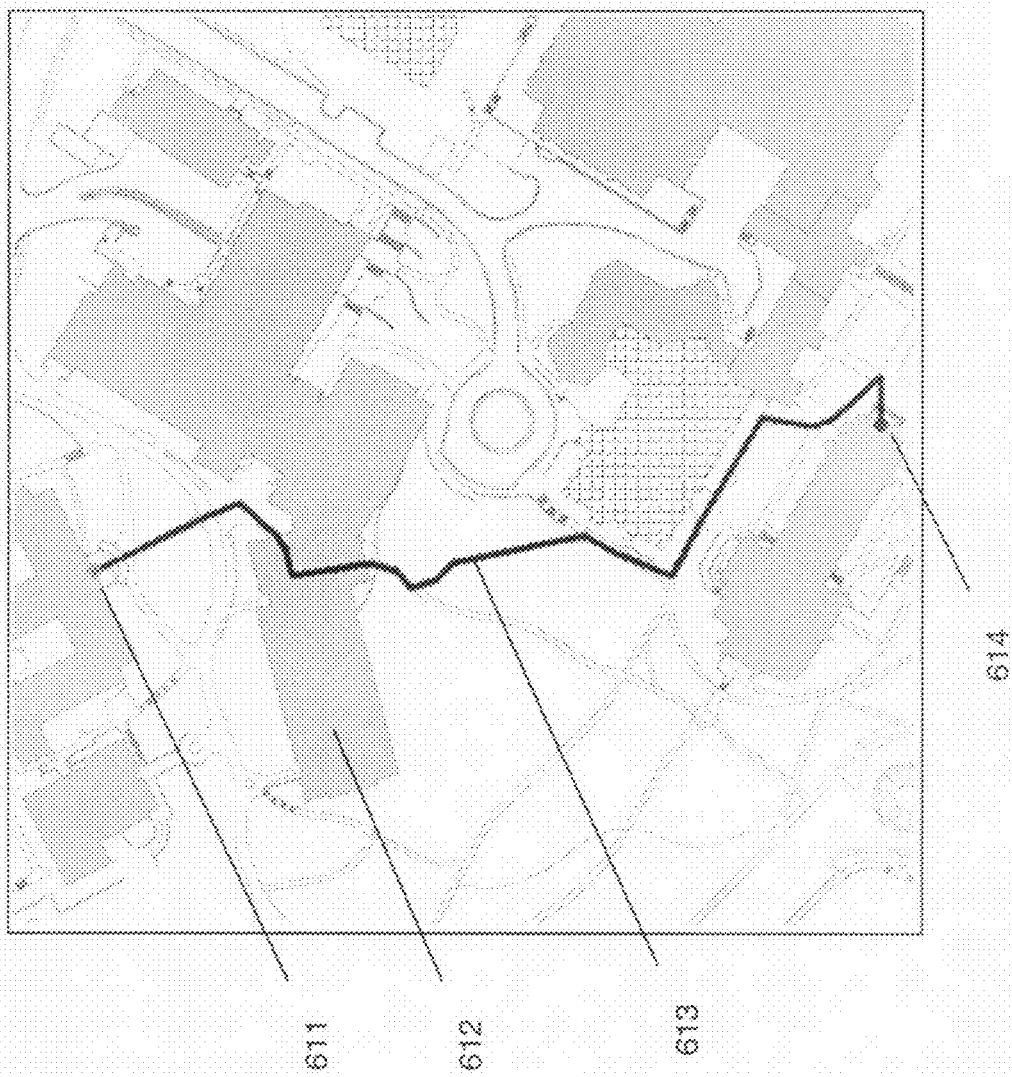
FIG. 7 is a screen view of a walking route of a walking route navigated through a building according to user-inputted locations according to one embodiment of the present invention.

The generated walking routes are capable of incorporating multiple destinations (interim points) in an iteration of the proposed invention. The user can set up several stops as shown in FIG. 4, with nodes 401, 402, and 403, representing buildings A, B, and C, along a route following directions from a beginning destination 400 to an ultimate destination 404, representing building D. As seen in FIG. 3, the user preferably inputs multiple nodal destinations, or waypoints, into a GUI 300 as waypoint 1, waypoint 2, waypoint 3, waypoint 4, waypoint 5, (310, 320, 330, 340, and 350 respectively) and so on. Waypoint stops 510, 520, 530, 540, and 550 represent those inputted destinations and can be seen graphically in FIG. 5. Additionally, routes are not limited to one campus within a network of campuses within a university, e.g. traveling from geographically separated eastern and western campuses of a university.

An additional feature available when generating walking routes is an option to identify local amenities that will be displayed along the route. These points of interest can include but are not limited to laundromats, computer labs, printing stations, dining options, coffee shops, banks/ATMs, post offices, shipping offices, medical centers, libraries, and shopping centers.

Figure 8:
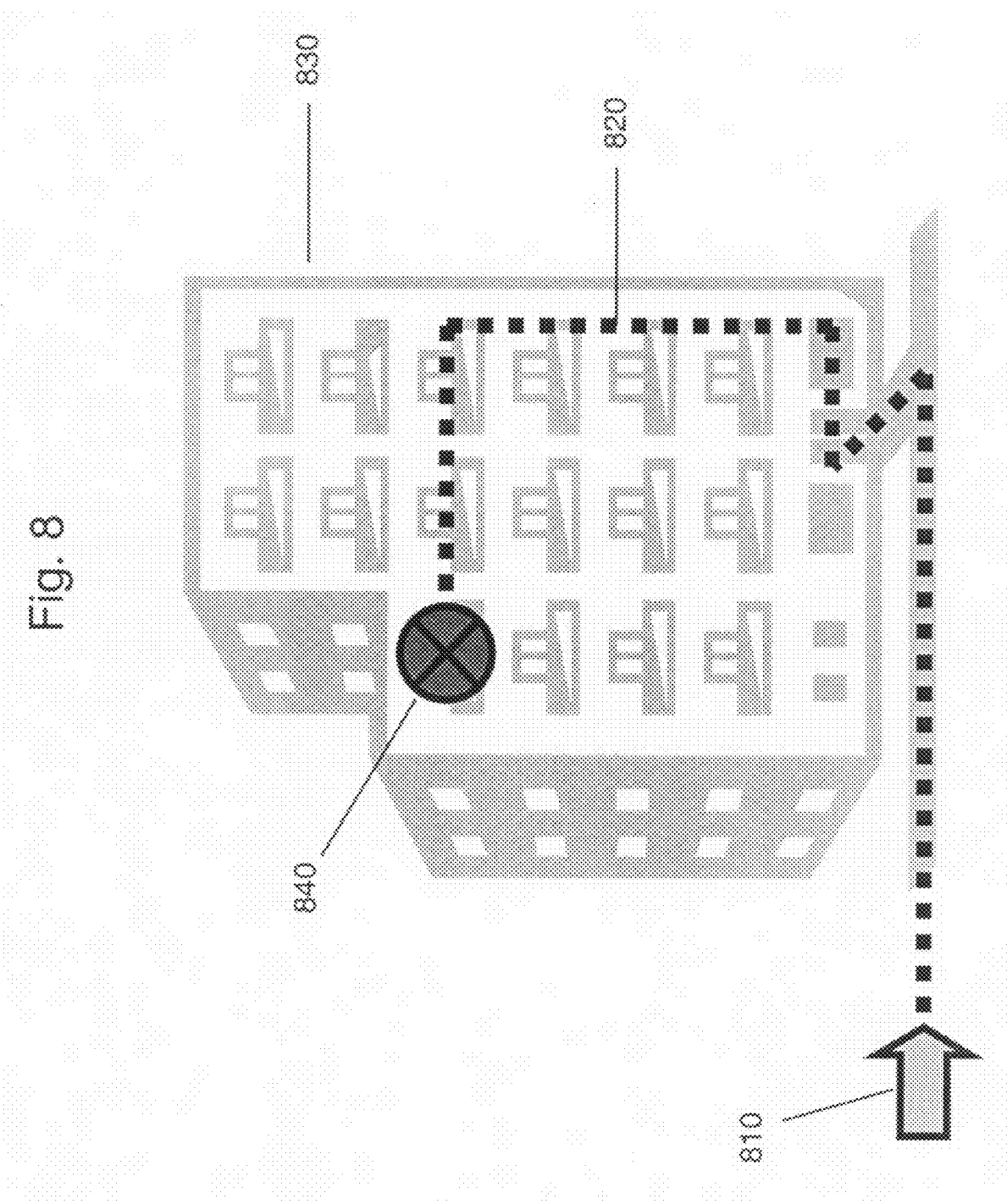
FIG. 8 is simplified graphical representation of intra-building navigation according to the present invention.

Destinations are not limited to simply buildings in general but rather specific locales within a desired building, such as the second floor conference room of a building. As generally shown in FIG. 8, a route 820, navigates the user inside a building 830 to a specified location 840 from a starting location 810. The desired locale will be taken into account when generating the route based on entryways and stairwells. Additionally, when generating certain routes, it may be advantageous to route a path through a building, e.g. a pass through a building's lobby. By routing a pedestrian through a building as opposed to around, it may significantly reduce the required travel time.

Upon completion of route generation, the user is able to print their directions in whole or in parts of desired route stages, allowing the user to highlight certain sections of an itinerary. Further the system can generate textual directions corresponding to the graphical route.

Algorithm

Route Generation is accomplished according to an algorithm based on Dijkstra's algorithm implemented on a weighted graph. Dijkstra's algorithm, named after its discoverer, Dutch computer scientist Edger Dijkstra, is an algorithm that solves the single-source shortest path problem for a directed graph with non negative edge weights. The algorithm works by keeping, for each vertex v, the cost d[v] of the shortest path found so far between s and v. Initially, this value is 0 for the source vertex s (d[s]=0), and infinity for all other vertices, representing the fact that the system does not know any path leading to those vertices (d[v]=∞ for every v in V, except s). When the algorithm finishes, d[v] will be the cost of the shortest path from s to v—or infinity, if no such path exists.

Figure 9B:
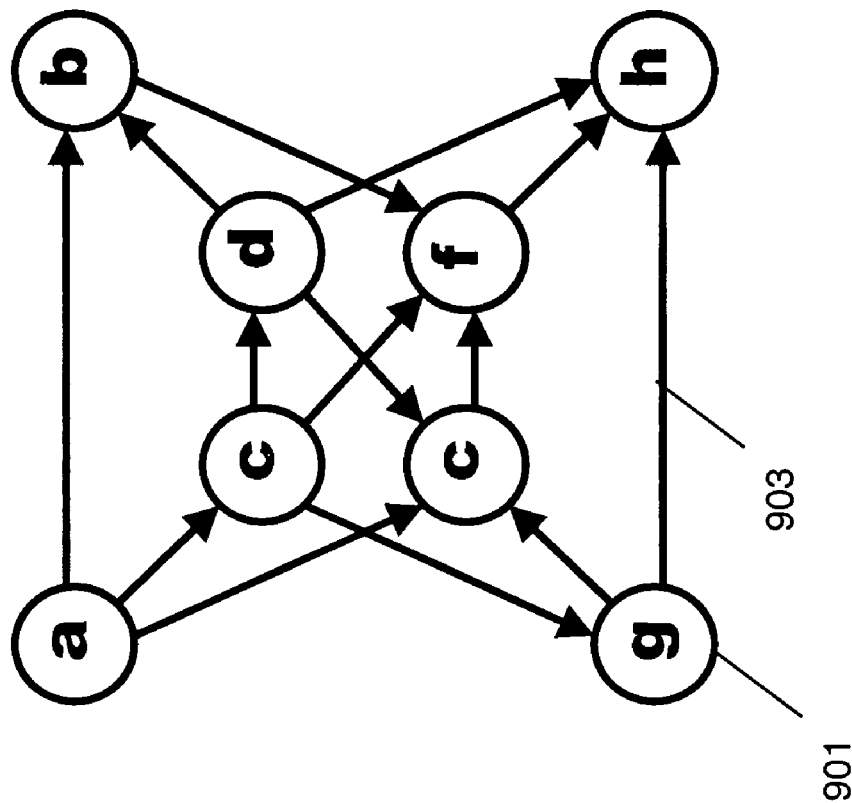
FIGS. 9A and 9B are simplified graphical representations of objects used in the navigation algorithm according to the present invention.
Figure 9A:
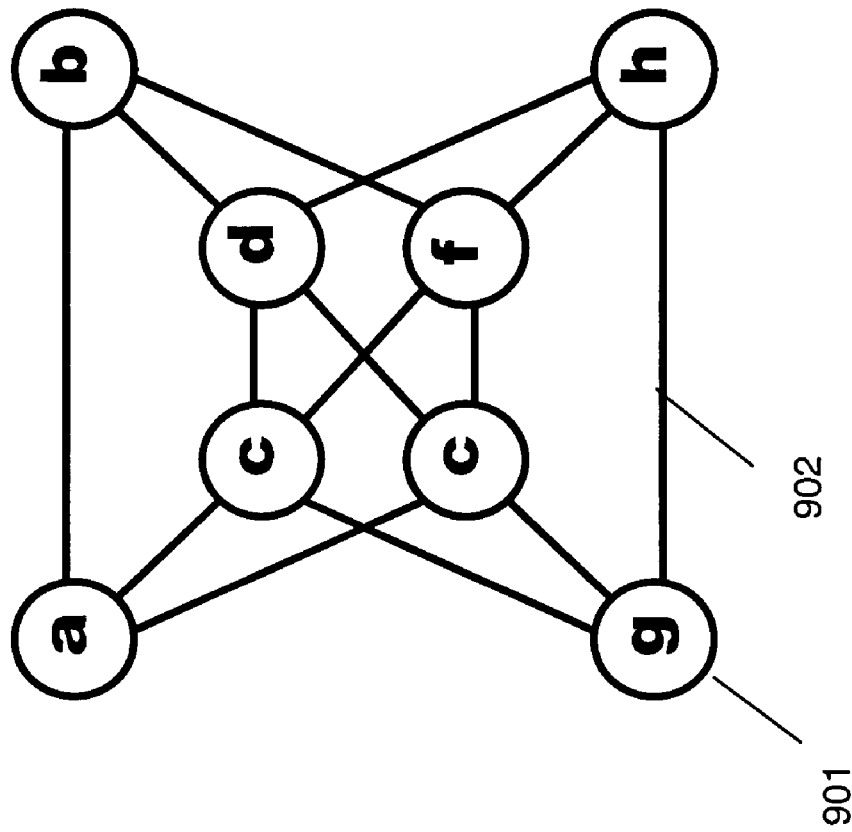

The coding of Dijkstra's algorithm in the present invention is preferably completed by using objects referred to as 'graphs' as seen in FIGS. 9 and 10. These 'graphs' contain vertices and weighted edges representing locations and sidewalks between those specific locations as represented by elements 901 and 902 respectively in FIG. 9 and elements 911 and 912 respectively in FIG. 10. These edges or route segments are weighted by a number, namely the distance between the two nodes.

Figure 10B:
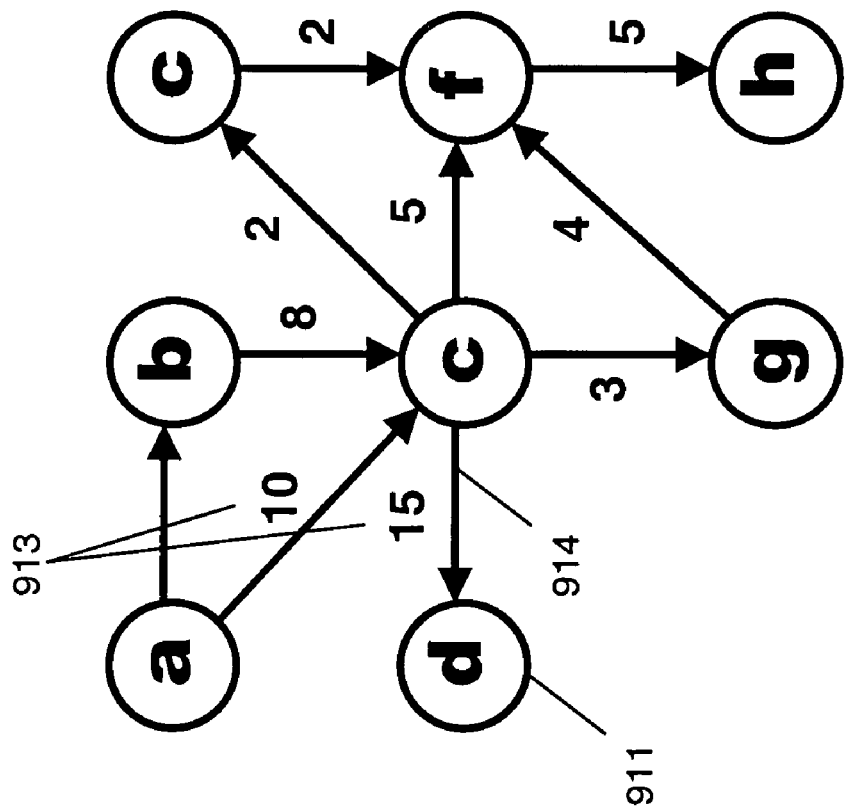
FIGS. 10A and 10B are simplified graphical representations of objects used in the navigation algorithm according to the present invention.
Figure 10A:
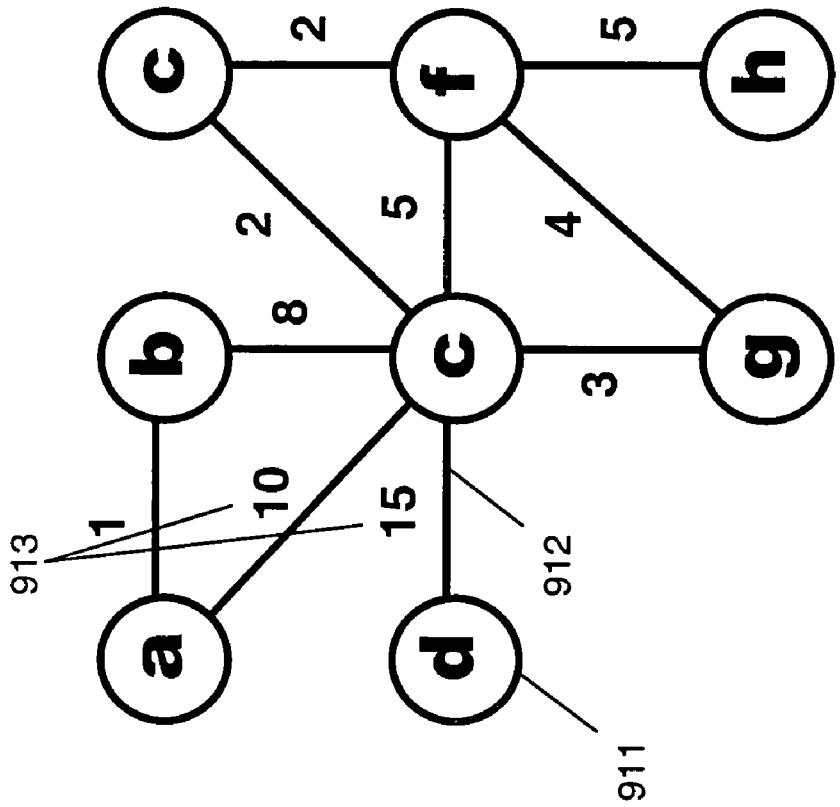
Figure 12:
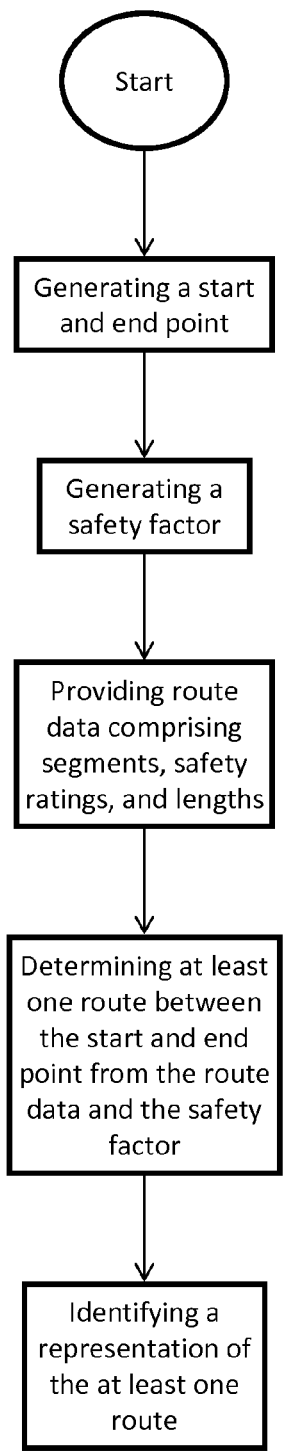

The algorithm finds the shortest path between two nodes; "shortest" as used here refers to minimizing or selecting the path that has the least weight, as defined in the equation used above in the safe route feature. As implemented in the present invention software code is created by reference to objects called 'graphs,' which contain vertices and weighted edges. The vertices are locations and the weighted edges are sidewalks to those specific locations. As seen in FIG. 10A and FIG. 10B, these graphs will be weighted by a number 913, namely the distance between the two nodes. The edges connecting the different nodes in FIGS. 9B and 10B (e.g. weighted edges 903 and 914, respectively) are unidirectional edges meaning that the system cannot allow a route to be generated that reverses direction after reaching one node. The present invention uses this 'one-way' principle to force the system to take a bus route. Due to the complexities that can incur from a two-way routing system, the algorithm of the present invention preferably uses one-way bus routes that force the generation of a route such that the user must take a bus route even if the apparent distance is further than the direct walking distance. This in turn will force the user to take the bus the entire way from Route A to Route B rather than getting off the bus and walking to a different bus stop to retake that very same bus. Moving vehicles typically move faster than people and the present invention weights these routes accordingly.

According to a preferred embodiment of the present invention, sample pseudo code implementing the above routing algorithm is provided in FIG. 11. In essence, a function is written that uses the database of campus information to create the shortest path (a path having the least weight compared to other potential paths) and then directions and time requirements are generated accordingly.

With reference to the pseudo-code shown in FIG. 11, the routing algorithm, according to a preferred embodiment of the present invention functions as follows. First, this algorithm sets up a specific node, and sets all distances around it to infinity, thus not differentiating any specific location until later in the program. All nodes are then added to a "Priority Queue." A Priority Queue is a type of list that contains and sorts nodes automatically based on their weights. The program will then loop through the collection of nodes and try to find the shortest distance between two nodes. If a distance is shorter than a previously recorded one, the program will automatically replace that distance (all infinities are thus replaced with finite numbers). This program also determines if a node was previously visited, so that a user will not be routed back and forth between specific locations indefinitely. For each node that was visited, their "parent" or the node that was tracked beforehand is noted and then stored in another list.

Thus a non-linear path between the user's inputted departure and destination points is created. This novel technique of creating paths is preferably not based on a traditional 2-D grid system, but rather examines the 3-D ("3-dimensional") space of an area. The algorithm takes these factors into account, such as elevation change on a path or floor change in a building, in order to calculate the best route direction and overall efficiency.

Any and all routes can be modified to accommodate handicapped status and can make recommendations to the user in order to make a route for appropriate, e.g. altering a route in order to include a wheelchair ramp in order to access a certain building. The system will also be updated to reflect changing conditions around campus according to construction, traffic changes, etc. These changes will be observed and inputted by personnel who will periodically tour campus. Additionally the system may be updated according to updates from a central planning entity such as a campus facilities management department of a university. These entities may receive campus map updates several years in advance of changes to the campus which would modify the route segments available to the system of the present invention. Preferably, as soon as the database is updated, client portion of the system is instantaneously updated to reflect those changes.

Alternatively running/jogging routes may be generated in accordance with a desired running distance and by including desired destinations along the route.

Feedback System

Preferably the system of the present invention is equipped with a user feedback system. This will serve as a customer service input and as a listening post for the administrators so as to maximize service and correct any errors with the system. This will also serve to update the system to any changing campus conditions.

Devices

The presented invention will be compatible for use with various devices including but limited to Personal Computers, Handheld electronics including cell phones, PDAs, etc, and any other electronic device capable of accessing the Internet; alternatively, as discussed above, the electronic device could be a stand alone unit that does not require continuous Internet connectivity to function properly. These devices can be utilized in-transit via real-time updates to assist the user in their navigation.

Web Portal

Optionally, to better serve users, this system according to the present invention allows users to create and store profiles that will enhance their experience with the system. When logged into the system under their profile, the system will save route information and destinations for future access. This feature allows users to store desired information for future use including favorite routes and common destinations preference. Furthermore, users will be able to view lists of favorite destinations as labeled such by other users. The web portal of the present invention preferably functions primarily on PHP with a mySQL database. Moreover, the system of the present invention also uses HTML, JavaScript, XML, and the combination of the two in AJAX. Cookies will be stored on client-side browsers to indicate their preferences and location of choice (which university they are at, which restaurants they like, where they visit, etc.).

Dining

Optionally in accordance with an alternative embodiment of the present invention, in addition to enhancing route generation, the user profile serves to enhance the Dining portion of the system. With local restaurants joining the online system, the user is granted access to menu information, write reviews of featured restaurants, rate them on a numerical scale, and view restaurant ratings by fellow system users. The user is able to receive special individual benefits by accessing the restaurant rating system and contributing their own reviews. A special feature specifically geared towards linking users with local restaurants is a membership card offering special discounts to cooperating restaurants. The users profile information from the website can be synced to their membership card as well. Furthermore, restaurants are granted profiles from which they will be able to stream special deals or discounts onto the system for user access. The navigation component, as described above for the present invention, may highlight those companies along a user's routes with ongoing deals.

Informational Component

In a further effort to connect the user with the campus and surrounding community, the system optionally may provide information on local places of interest. Additionally, the system is linked to local event calendars, including those but not limited to the college, community, museum, theaters, social groups, etc., in order to highlight various events and activities taking place locally and easily link users to these locations through the navigation service. Additionally, pictures are included in the system to help unfamiliar users to readily identify locations along their route. Further, directions correlating with the routes generated by the present invention can be automatically reduced to a digital audio recording that can be placed on a portable audio player (e.g. an MP3 player) thereby allowing users to listen to directions while they move. The recording can be used for touring purposes, to identify hot spots, etcetera. Recordings may be prerecorded for planned tours and the user can be prompted to pause the recording and then press play once the user reaches a certain location (to play the next specified direction).

Therefore, another embodiment of the present invention is a directional guide for safe passage between at least two points that provides directions identify the route segments connecting the two points. The route segments are determined from each segment's respective length and safety rating. Such a guide may be embodied in a number of different ways, for example, an electronic device, a printed medium or media (where, for instance, the lengths and safety ratings are shown next to the route segments), or as audio signals emitted by an audio player. Therefore, there directions may be textual, audio, or graphical. A user may also choose a safety factor that further influences which route segments are in selected for safe passage between the two points.

Certain modifications and improvements will occur to those skilled in the art upon a reading of the foregoing description. By way of example, the system of the present invention could be easily implemented in a non-campus, but primarily pedestrian setting, such as a local urban community. The aforementioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the following claims.

What is claimed is:

1. A method of identifying a representation of at least one route for guiding a user comprising the following steps:
   providing a computer readable medium having instructions for causing a computer to execute the method;
   generating a start and end point;
   generating a safety factor;
   providing route data comprising segments, safety ratings, and lengths wherein each segment has an associated safety rating and length;
   determining at least one route between the start and end point from the route data and the safety factor;
   wherein the at least one route is determined by selecting a series of at least one segment that has a lowest weight compared to the weight of at least one other series of at least one other segment wherein the weight of each segment is calculated by an equation that uses a non-linear relationship between the route data and the safety factor; wherein the equation comprises:

weight=(length)/((safety rating)^(safety factor));

and
   identifying a representation of the at least one route.

2. The method of claim 1 wherein the at least one route includes a safer route and a faster route.

3. The method of claim 1 wherein each segment represents a linear geographic line between two nodes.

4. The method of claim 1 wherein the route data is at least partially pedestrian route data.

5. The method of claim 4 wherein the route data is further at least partially wheeled transportation route data.

6. The method of claim 1 wherein the at least one route has both pedestrian and wheeled transportation portions.

7. The method of claim 1 wherein the step of identifying further includes identifying the representation of the at least one route on an electronic display.

8. The method of claim 1 wherein the step of identifying further includes identifying the representation of the at least one route on a printed medium.

9. The method of claim 1 wherein the at least one route passes through at least one building.

10. The method of claim 1 wherein the at least one route has at least one interim point.

11. The method of claim 1 wherein each segment comprises a line between two points wherein the two points exist in a 3-dimensional space.

12. The method of claim 1, further including a graphical safety slider that permits changing the safety factor on a continuous range between safest and fastest route.

* * * * *